(12) United States Patent
Santosuosso

(10) Patent No.: US 9,020,929 B2
(45) Date of Patent: Apr. 28, 2015

(54) METHOD AND SYSTEM FOR TRACKING PERFORMANCE BY BREAKING DOWN A QUERY

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 3251 days.

(21) Appl. No.: 10/911,844

(22) Filed: Aug. 5, 2004

(65) Prior Publication Data

US 2006/0031200 A1   Feb. 9, 2006

(51) Int. Cl.
*G06F 7/00* (2006.01)
*G06F 17/30* (2006.01)

(52) U.S. Cl.
CPC ...... *G06F 17/3051* (2013.01); *G06F 17/30306* (2013.01); *G06F 17/30483* (2013.01)

(58) Field of Classification Search
None
See application file for complete search history.

(56) References Cited

U.S. PATENT DOCUMENTS

| | | | | |
|---|---|---|---|---|
| 5,668,987 | A * | 9/1997 | Schneider | 1/1 |
| 5,848,408 | A * | 12/1998 | Jakobsson et al. | 707/714 |
| 5,893,088 | A * | 4/1999 | Hendricks et al. | 707/696 |
| 6,341,281 | B1 * | 1/2002 | MacNicol et al. | 1/1 |
| 7,529,752 | B2 * | 5/2009 | Hinshaw et al. | 1/1 |
| 7,925,665 | B2 * | 4/2011 | Schneider et al. | 707/774 |
| 2002/0116357 | A1 * | 8/2002 | Paulley | 707/1 |
| 2003/0014399 | A1 * | 1/2003 | Hansen et al. | 707/3 |
| 2003/0212668 | A1 * | 11/2003 | Hinshaw et al. | 707/3 |
| 2005/0021511 | A1 * | 1/2005 | Zarom | 707/3 |
| 2005/0044063 | A1 * | 2/2005 | Barsness et al. | 707/2 |
| 2005/0065928 | A1 * | 3/2005 | Mortensen et al. | 707/5 |
| 2005/0192921 | A1 * | 9/2005 | Chaudhuri et al. | 707/1 |
| 2006/0020579 | A1 * | 1/2006 | Freedman et al. | 707/3 |
| 2006/0031189 | A1 * | 2/2006 | Muras et al. | 707/2 |

* cited by examiner

*Primary Examiner* — Rehana Perveen
*Assistant Examiner* — Raheem Hoffler
(74) *Attorney, Agent, or Firm* — Wood, Herron & Evans, LLP

(57) ABSTRACT

A database monitor tracks performance statistics and information about the execution of different SQL statements. In particular, the monitor tracks information about the individual instructions that comprise a complex query. The performance statistics and information from these individual elements provide insight into a query's performance and may show why a query's performance is below expectations.

21 Claims, 5 Drawing Sheets

METHOD AND SYSTEM FOR TRACKING PERFORMANCE BY BREAKING DOWN A QUERY

FIELD OF THE INVENTION

The invention relates to database management systems, and in particular, to monitoring query performance.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

Even though current query optimizers are robust enough to routinely select the best access plan for execution, there are still instances in which query performance is below user expectations and other techniques are needed to improve performance of a database. A database monitor is a tool that automatically tracks and records information about a query as it executes. Current database monitors typically store this information in a database table with multiple records per query. This database table can itself be queried for records matching certain characteristics.

The type of data that can be collected by a database monitor is large and varied. Common statistics collected by a database monitoring tool include file size, memory size, processor speed, number of processors available, the SQL statement (with parameters replaced), type of SQL operation, number of row updated, inserted, or deleted, number of rows fetched, elapsed time for this operation, access plan rebuild code, table name, join fields, estimated completion time, estimate I/O operations, number of rows in the table, index name, hash used, host variables, join position, join method, join type, etc. In addition, other characteristics about the query can be collected as well.

The collected information can be analyzed by a database administrator to locate problematic queries, from a performance standpoint, who then can implement changes that may address the problems. Even though current database monitoring tools are powerful, improvements are needed that provide even more information to a database administrator. In particular, there are a variety of separate reasons why a complex query comprised of a number of instructions may take a long time to execute; however, current database monitoring tools do not provide enough details to determine why the query's performance may be below expectations. Thus, there remains the need in prior database environments for a system that permits tracking and collecting of performance statistics and information about individual elements within a query.

SUMMARY OF THE INVENTION

Embodiments of the present invention relate to a database monitor that tracks information about the individual instructions that comprise a complex query. The performance statistics and information from these elements provide a deeper insight into a query's overall performance and may show why a query's performance is below expectations.

One aspect of the present invention relates to a method for monitoring execution of a database query. In accordance with this aspect, a database query is separated into one or more distinct sub-elements and each of these sub-elements are executed. During execution of each of these sub-elements, each sub-element is individually monitored. In one particular embodiment, an SQL statement is separated into separate instructions that are executed and monitored individually to determine performance information related to each of the instructions.

DETAILED DESCRIPTION

As mentioned above, the embodiments discussed hereinafter utilize a database engine and monitoring tool that support monitoring the individual instructions that make up a database query. Instead of only providing the execution start and end times for a query, the database monitoring tool described herein breaks down the query into individual instructions and monitors the performance of these individual instructions. A specific implementation of such a database engine and monitoring tool capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
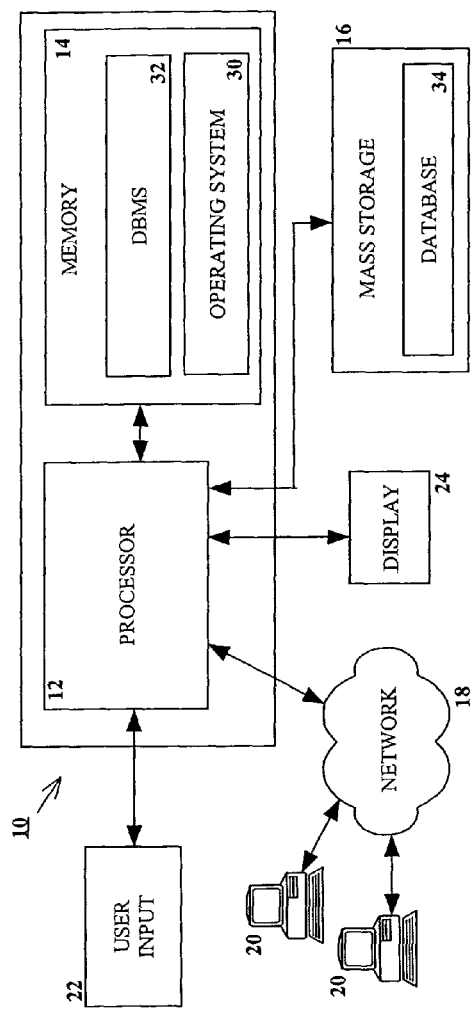
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that considers previous performance statistics when selecting access plans consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 maybe considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
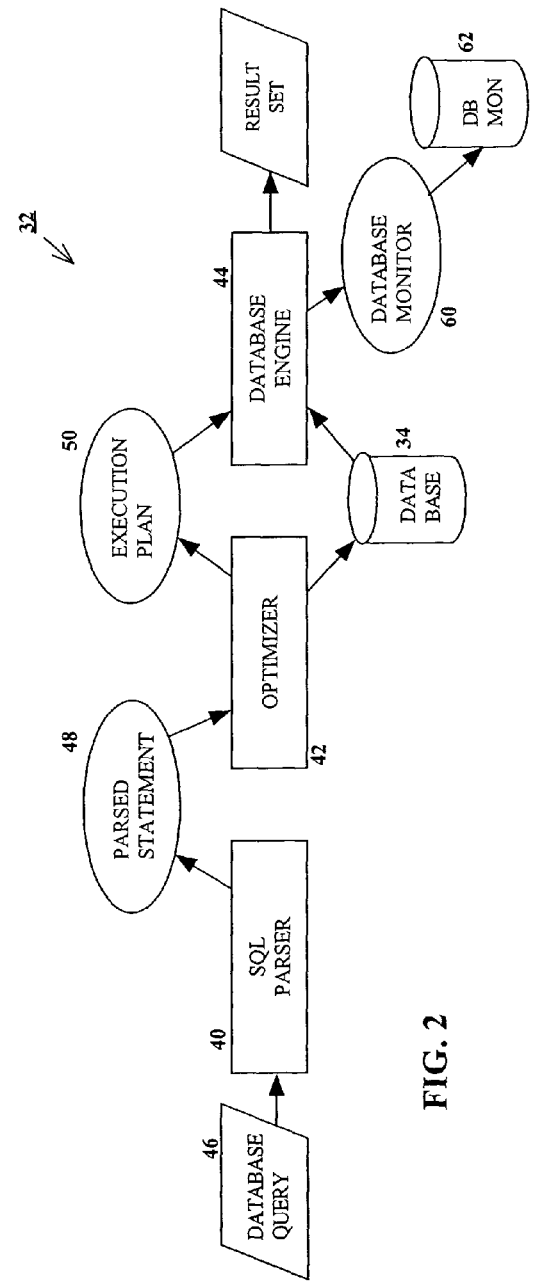
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, cost-based optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

While the database engine 44 executes the query 46, a database monitor 60 tracks performance of the execution and collects statistics and other information about how the plan 50 is performing. The statistics and information for each query 46 are stored in a monitor database 62. The database monitor 62 is advantageously a relational database that permits easy searching and retrieval of data.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3A:
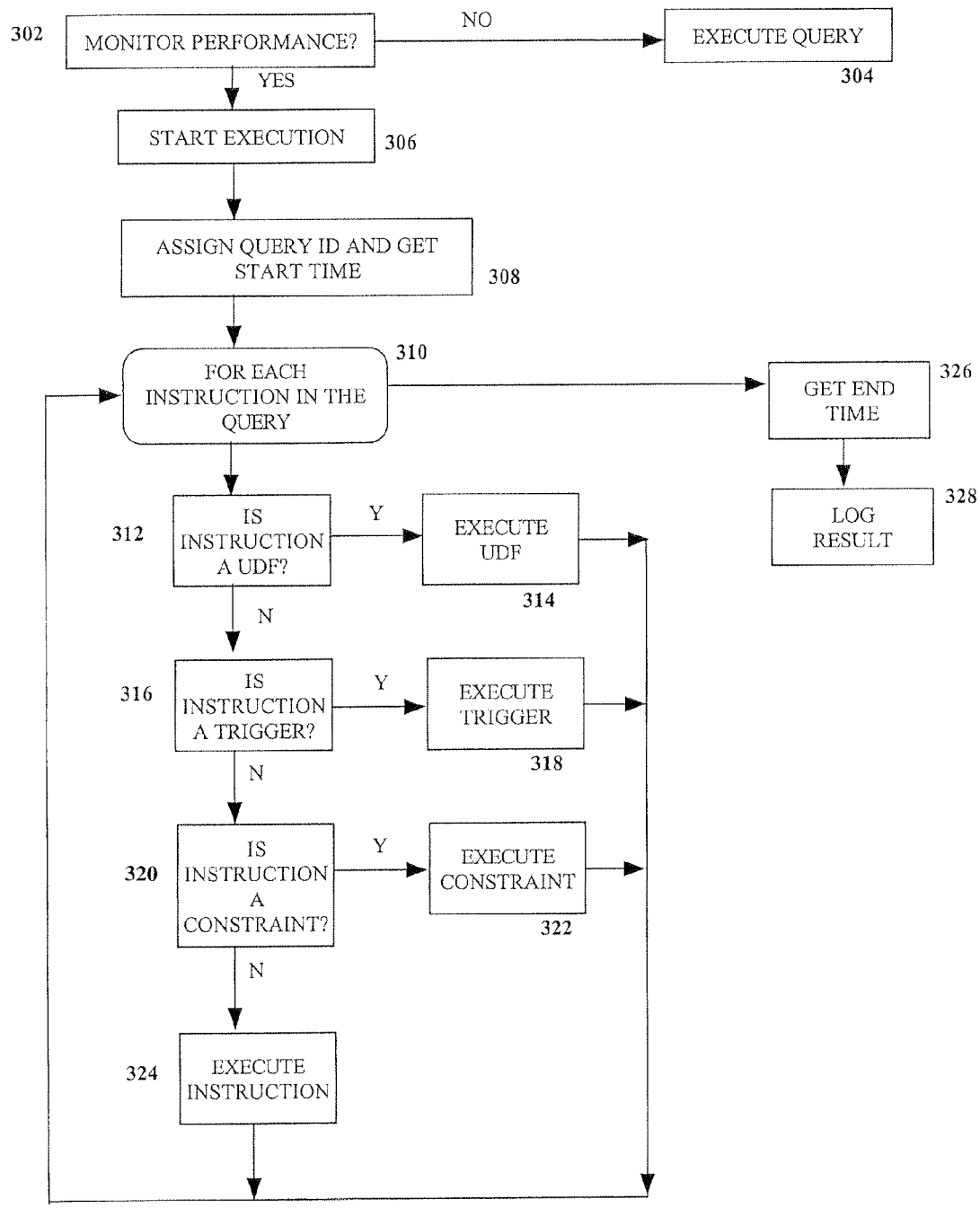
FIG. 3A illustrates a flowchart of an exemplary method for monitoring query performance.

Turning now to FIG. 3A, a flowchart is depicts of an exemplary method of monitoring the performance of a database query in accordance with the principles of the present invention. In particular, a database query is broken down into its sub-elements, or individual instructions, so that the performance of the query can be monitored with finer granularity than simply monitoring the overall query performance. The flowchart of FIG. 3A explicitly identifies three sub-elements of a query: a user defined function (UDF), a trigger, and a constraint. These sub-elements are explicitly discussed because of their prevalent use. However, the present invention also contemplates other sub-elements which a query can be broken down into, although all such possible sub-elements are not explicitly discussed herein.

The variety and complexity of software applications that can be created using structured query language (SQL) rival that of many traditional programming languages and, accordingly, program development with SQL can be similar to traditional program development methods and techniques. In particular, a user can create or develop program structures called "user defined functions" (UDFs). Once such a structure is developed, it can be re-used in multiple SQL statements by simply referring to its name much like a function call in traditional programming languages.

The use of UDFs provides software developers the ability to generate functional code in ways that are familiar to them and to create code that is easier to read, understand, and maintain. An SQL query that includes references to UDFs will not be obscured by the multiple lines of actual code that form the UDF but, instead, will simply have a statement that references a single, appropriately-named UDF. Also, if programmatic changes are needed, multiple instances of code will not need to be modified. Rather, the one instance of a UDF can be revised and all references to that UDF will be able to take advantage of the revisions. UDFs are prevalently used in providing web services and so the popularity of using UDFs has grown along with the popularity of the Internet.

A database constraint is an object within the database management system that does not permit updates or changes to the database which would break rules that have been established, such as for business or integrity reasons. Thus, constraints are declarations of conditions about the database that must remain true. When an action is performed in the database, the database engine checks for violations of any existing constraints and aborts the action accordingly. As a result, the performance time of a database query may be affected by whether it not it implicates an existing constraint and the execution time of that constraint. An exemplary constraint may be that a record in one table may not be created without an associated record already existing in another table or that a value in one table may not exceed a certain amount.

A database trigger is an SQL object that is similar to a procedure except that a procedure requires an explicit call to begin execution. A trigger, on the other hand, is executed implicitly whenever the trigger event happens. Examples of triggering events may be execution of a INSERT, DELETE, or UPDATE command on a table or record. As known to one of ordinary skill, a trigger can occur after or before the command and can be configured to execute for each row affected by the triggering statement or to execute once for the entire statement. Another automatic activity that many database systems perform that resembles either a trigger or a constraint involves automatic index rebuilding. When an record is modified and one or more indices are implicated by this change, the database engine automatically initiates a routine to rebuild the implicated indices. Therefore, the present invention contemplates tracking or monitoring how much time was spent on the index activity and how much time was spent on query activity.

Returning now to the flowchart of FIG. 3A, the database monitoring tool is configured, in step 302, to perform monitoring or not to perform monitoring on a query as it is executed. If no monitoring is being used, then the query executes conventionally in step 304. If, however, performance monitoring of the query and its sub-elements is desired, then query execution starts in step 306. Initially, the query is assigned a query ID and a start time is determined, in step 308.

In step 310, the query is broken into individual instructions or sub-elements and processing of each of these elements is performed in the loop depicted in the flow chart. Thus for each instruction in the query, a determination is made, in step 312, if the instruction is a UDF. If so, then another subroutine 314 is called to monitor the execution of the UDF.

If the instruction is not a UDF, then, in step 316, a determination is made if the instruction is a database trigger. If so, then a separate sub routine 318 is called to monitor execution of the trigger.

If the instruction is not a UDF or a trigger, then, in step 320, a determination is made if the instruction a database constraint. If so, then a sub routine 322 is called to monitor execution of the constraint.

Other sub-elements or instructions in addition to UDFs, triggers, and constraints could be tested as well. Eventually, however, a determination is made that the instruction does not fall in a category to be individually monitored and the instruction is executed, in step 324. After each instruction is executed, the flow returns to step 310 until all the instructions or sub-elements of the query have been handled. Once no more instructions need to be processed, the loop exits to step 326 where an end time for the query is generated. The database monitor then creates a record, in step 328, that logs the statistics about the query performance.

Figure 3B:
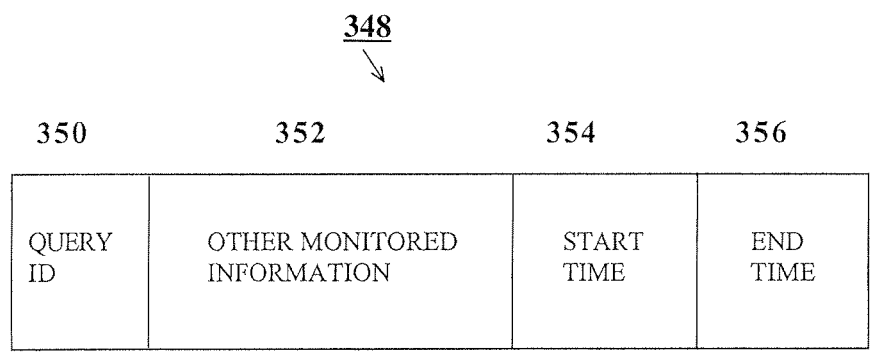
FIG. 3B illustrates an exemplary record format for performance statistics about a query.

An exemplary record 348 is depicted in FIG. 3B. This record 348 includes an identifier 350 of the query, a variety of other information 352 about the query, the start time 354 of the query, and the stop time 356 of the query. One of ordinary skill will recognize that the other information 352 can be any of a wide variety of information and statistics typically monitored during query execution.

Figures 4A, 4B:
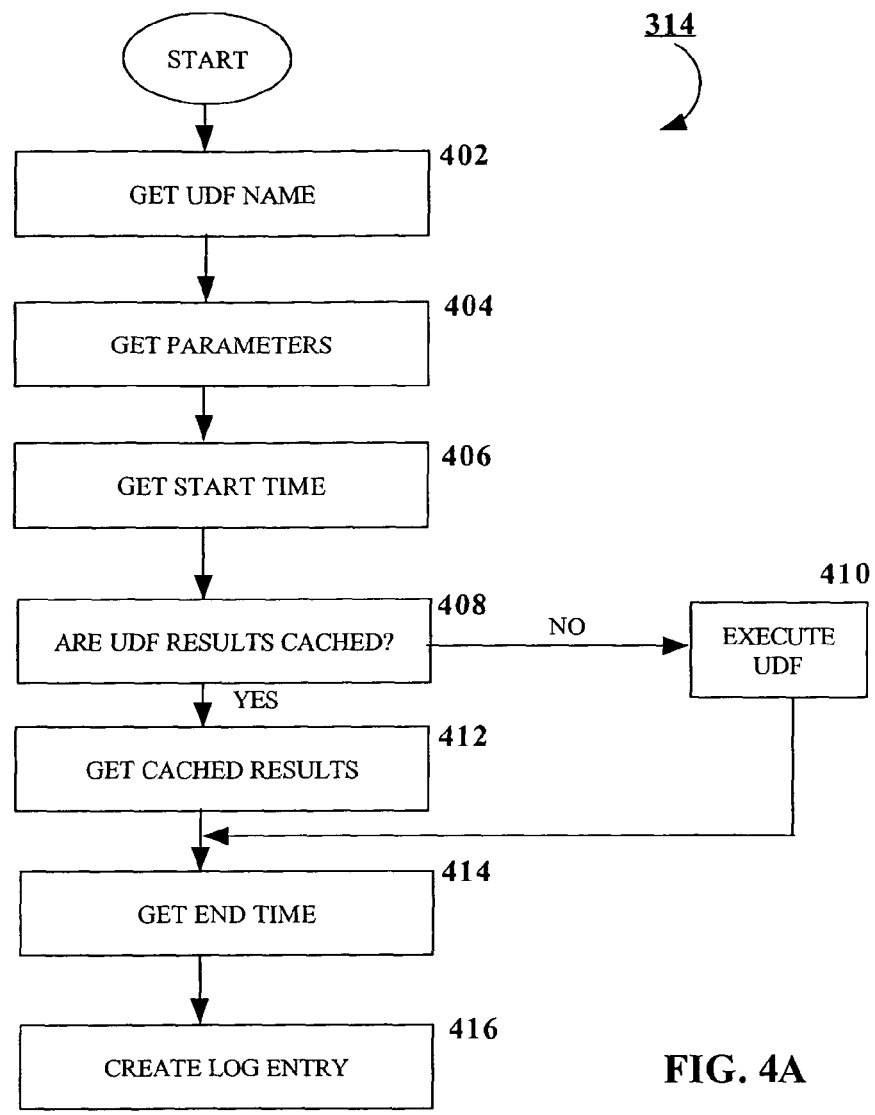
FIG. 4A illustrates a flowchart of an exemplary method of monitoring performance of a User Defined Function (UDF).
FIG. 4B illustrates an exemplary record format for performance statistics about a UDF.

FIG. 4A depicts a flowchart of an exemplary method to perform subroutine 314 to monitor the performance of a UDF. In step 402, the UDF name is determined and, in step 404, the parameters that are included in the UDF invocation are determined. In step 406, the start time of the execution of the UDF is determined. Because a UDF represents a function that typically gets invoked a number of times, the results of a UDF invocation are frequently cached for future use. Thus, in step 408, a determination is made as to whether the results for this particular UDF and parameters is cached. If so, then the cached results are retrieved, in step 412.

If the UDF results are not cached, then the UDF is executed in step 410. Once the results are returned (via the cache or via execution), the end execution end time for the UDF is determined, in step 414, and a record is generated, in step 416, regarding the performance of the UDF.

An exemplary record 448 is depicted in FIG. 4B that includes a number of field useful for tracking and monitoring UDFs. These fields are exemplary in nature and other fields may be included or omitted as well. The query ID 450 is included so as to allow tracking of UDFs for each query; a UDF name 452 is included to identify the UDF. Of particular interest is the start time 454 and stop time 456 of the UDF which indicates the performance time of the UDF. The parameters 458 referenced by the UDF may also be useful information as they may show certain parameters that have a negative impact on performance as compared to other parameters. In addition, the parameter values allows a determination to be made how many unique invocations of the UDF occur. For example, even if the UDF is called thousands of times, it might always be called with the same parameters. A flag 262 may be included to indicate whether the results of the UDF were retrieved from a cache or whether the UDF had to actually be executed to generate the results.

Another field 460 having advantageous benefits is one that indicates what part of the statement the UDF occurred in. For example, the UDF may be invoked from the WHERE clause instead of the SELECT clause. This information along with the number of times a UDF is invoked and/or the amount of rows retrieved can be used to investigate, for example, whether a WHERE clause is selective enough before the particular UDF is invoked. The additional information provided by monitoring sub-elements of a database query will permit a database administrator to investigate how much time is spent working on the UDF and how much time is spent on the query itself. Additionally, with this new information, analysis tools may be developed that automatically identify invocations of a UDF that are different than other invocation, such as for example, a UDF invocation that takes much longer (e.g., 25 to 100 times) to execute than it normally does.

Figure 5A:
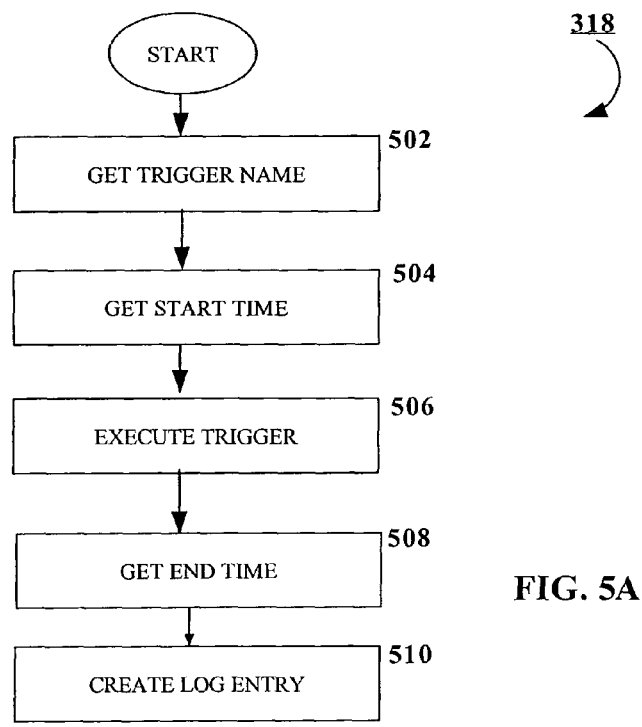
FIG. 5A illustrates a flowchart of an exemplary method for monitoring performance of a database trigger.

FIG. 5A depicts a flowchart of an exemplary method of implementing the subroutine 318 for monitoring the execution of a database trigger. When a trigger is encountered, this subroutine 318 is invoked and begins, in step 502 by getting the trigger name and the start time (step 504). The trigger is then executed, in step 506, and the time the execution completes is determined in step 508. From this information, a record is created and logged in step 510.

Figures 5B, 6B:
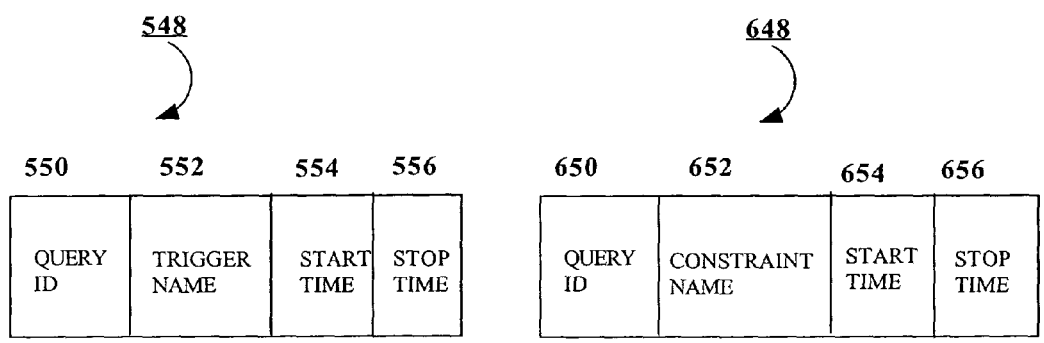
FIG. 5B illustrates an exemplary record format for performance statistics of a database trigger.
FIG. 6B illustrates an exemplary record format for performance statistics of a database constraint.

An exemplary record 548 is illustrated in FIG. 5B. This record 548 include a field for the query identifier 550, a field for the trigger name 552, and respective fields 554, 556 for the start and stop time of the execution of the trigger. With this information, a database administrator can determine how a trigger might be detrimentally affecting the performance of a database query.

Figure 6A:
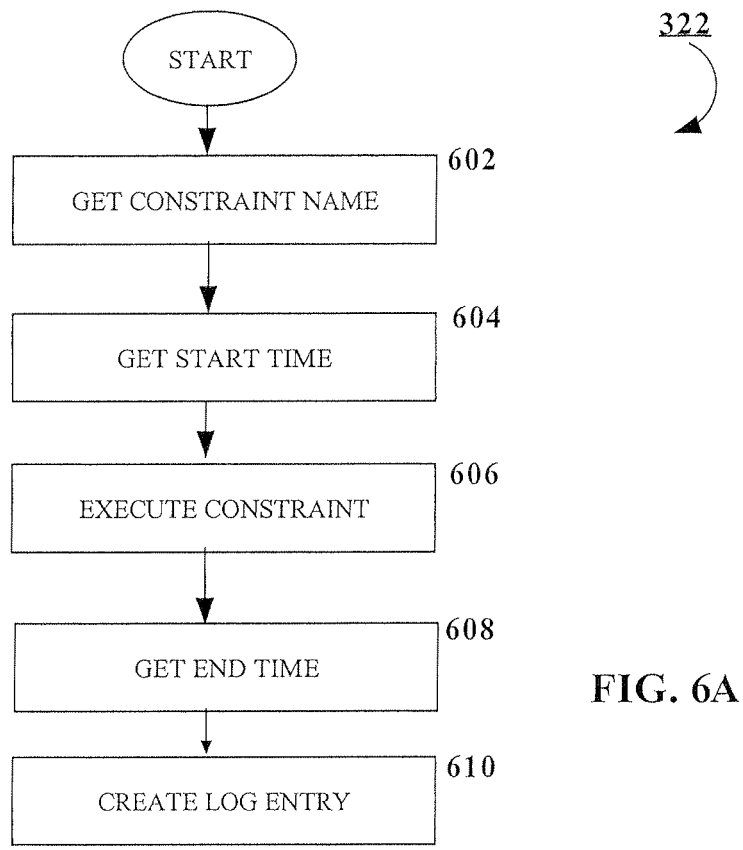
FIG. 6A illustrates a flowchart of an exemplary method for monitoring performance of a database constraint.

FIG. 6A illustrates an exemplary method for implementing the subroutine 322 for monitoring the execution of a database constraint. When a constraint is encountered while executing a database query, this subroutine 322 is invoked. In step 602 the constraint name is determined and in step 604 the execution start time for the constraint is determined. The constraint is then executed, in step 606, and the time its execution ends is determined in step 610. With this information, a record can be created and logged that reflects the performance statistics of the constraint.

While other fields are contemplated within the scope of this invention, FIG. 6B illustrates exemplary fields that are included in a record 648 that reflects the performance of a constraint. The record 648 includes a query identifier 650, the constraint's name 652, the execution start time 654, and the execution stop time 656.

Accordingly, a system and method has been described that tracks information about the individual instructions that comprise a complex query. The performance statistics and information from these elements provide insight into a query's performance and may show why a query's performance is below expectations. Various modifications may be made to the illustrated embodiments without departing from the spirit and scope of the invention. For example, the flowchart of FIG. 3A is simplified so as not to obscure the inventive aspects of the present invention. However, it is understood that a UDF may result in a trigger condition or invocation of a constraint or similarly, a trigger may invoke a UDF. Thus, the exemplary flowcharts and records described herein may be modified to account for nested or recursive operations that may occur when executing a database query. Therefore, the invention lies in the claims hereinafter appended.

What is claimed is:

1. A method for monitoring execution of a database query comprising the steps of:
    separating the database query into sub-elements;
    executing each of the sub-elements of the database query;
    individually monitoring execution of each of the sub-elements during execution of the database query, including determining for each sub-element a performance statistic associated with a performance time for such sub-element; and
    storing a result of the step of individually monitoring, wherein the database query comprises a plurality of instructions, and wherein each sub-element comprises an instruction.

2. The method of claim 1, wherein one of the sub-elements is a user defined function.

3. The method of claim 1, wherein one of the sub-elements is a database trigger.

4. The method of claim 1, wherein one of the sub-elements is a database constraint.

5. The method of claim 1, further comprising the steps of:
    in response to the step of individually monitoring, creating a respective record for each sub-element; and
    storing the respective records.

6. The method of claim 5, wherein the respective record includes:
an identifier of the database query; and
an identifier of the respective sub-element.

7. The method of claim 5, wherein the respective record includes:
a list of one or more parameters referenced by the respective sub-element; and
an identifier of where the respective sub-element occurs in the database query.

8. The method of claim 1, wherein the step of individually monitoring further includes the steps of:
determining an execution start time for the respective sub-element; and
determining an execution completion time for the respective sub-element.

9. The method of claim 1, further comprising the steps of:
determining an execution start time for the database query; and
determining an execution completion time for the database query.

10. A method of monitoring execution of a structured query language (SQL) statement, the method comprising the steps of:
separating the SQL statement into a plurality of instructions;
executing each of the plurality of instructions of the SQL statement;
individually monitoring performance for each of the plurality of instructions during execution of the SQL statement, including determining for each instruction a performance statistic associated with an amount of time required to execute the such instruction; and
storing, in a respective record, information related to the individually monitored performance for each of the plurality of instructions.

11. The method of claim 10, further comprising the steps of:
monitoring overall performance of the SQL statement; and
storing in another record, statistics related to the monitored overall performance.

12. The method of claim 10, wherein at least one of the plurality of instructions is selected from a group consisting of:
a user defined function, a database constraint, and a database trigger.

13. The method of claim 10, wherein the respective record includes:
an execution start time for the respective instruction; and
an execution completion time for the respective instruction.

14. A program product, comprising:
a program code configured upon execution to:
separate a database query into sub-elements;
execute each of the sub-elements of the database query; and
individually monitor execution of each of the sub-elements during execution of the database query, including determine for each sub-element a performance statistic associated with a performance time for such sub-element, wherein the database query comprises a plurality of instructions, and wherein each sub-element comprises an instruction, and
a computer-readable storage medium bearing the program code.

15. An apparatus comprising:
at least one processor;
a memory coupled with the at least one processor; and
a program code residing in memory and executed by the at least one processor, the program code configured to:
separate a database query into sub-elements;
execute each of the sub-elements of the database query; and
individually monitor execution of each of the sub-elements during execution of the database query, including determine for each sub-element a performance statistic associated with a performance time for such sub-element, wherein the database query comprises a plurality of instructions, and wherein each sub-element comprises an instruction.

16. The apparatus of claim 15, wherein at least one of the sub-elements is selected from a group consisting of:
a user defined function, a database constraint, and a database trigger.

17. The apparatus of claim 15, wherein the program code is further configured to:
create and store a respective record for each sub-element based on the monitored execution thereof.

18. The apparatus of claim 17, wherein the respective record includes:
an identifier of the database query; and
an identifier of the respective sub-element.

19. The apparatus of claim 17, wherein the respective record includes:
a list of one or more parameters referenced by the respective sub-element; and
an identifier of where the respective sub-element occurs in the database query.

20. The apparatus of claim 15, wherein the program code is further configured to:
determine an execution start time for the respective sub-element; and
determine an execution completion time for the respective sub-element.

21. The apparatus of claim 15, further comprising the step of:
determine an execution start time for the database query; and
determine an execution completion time for the database query.

* * * * *